(12) United States Patent
Sugawara

(10) Patent No.: US 11,344,848 B2
(45) Date of Patent: May 31, 2022

(54) POROUS FILM AND METHOD FOR PRODUCING SAME

(71) Applicant: TOKYO OHKA KOGYO CO., LTD., Kanagawa (JP)

(72) Inventor: Tsukasa Sugawara, Kanagawa (JP)

(73) Assignee: TOKYO OHKA KOGYO CO., LTD., Kanagawa (JP)

( * ) Notice: Subject to any disclaimer, the term of this patent is extended or adjusted under 35 U.S.C. 154(b) by 0 days.

(21) Appl. No.: 16/936,715

(22) Filed: Jul. 23, 2020

(65) Prior Publication Data

US 2020/0346169 A1 Nov. 5, 2020

Related U.S. Application Data

(62) Division of application No. 15/756,759, filed as application No. PCT/JP2016/075571 on Aug. 31, 2016, now abandoned.

(30) Foreign Application Priority Data

Sep. 4, 2015 (JP) .............................. JP2015-174532

(51) Int. Cl.
  *B01D 67/00* (2006.01)
  *B01D 71/34* (2006.01)
  (Continued)

(52) U.S. Cl.
  CPC ......... *B01D 67/003* (2013.01); *B01D 67/002* (2013.01); *B01D 69/02* (2013.01);
  (Continued)

(58) Field of Classification Search
  CPC ............ B01D 2323/24; B01D 2323/18; B01D 2325/021; B01D 2325/08; B01D 67/003;
  (Continued)

(56) References Cited

U.S. PATENT DOCUMENTS 5,002,825 A 3/1991 Mimura
6,126,826 A * 10/2000 Pacheco ............. B01D 67/0011
  210/500.27

(Continued)

FOREIGN PATENT DOCUMENTS

EP 1705027 A1 * 9/2006 ........... G03G 7/0046
JP 11-86828 3/1999
  (Continued)

OTHER PUBLICATIONS

International Search Report dated Nov. 22, 2016 in International (PCT) Application No. PCT/JP2016/075571.
  (Continued)

*Primary Examiner* — Pamela H Weiss
(74) *Attorney, Agent, or Firm* — Wenderoth, Lind & Ponack, L.L.P.

(57) ABSTRACT

Provided are a porous film having excellent surface smoothness and a method for producing the same. The surface roughness of a porous film of polyvinylidene fluoride, polyethersulfone, polyimide and/or polyamide-imide is Ra 30,000 Å or less. The opening diameter of the porous film is preferably from 100 nm to 5000 nm. The method for producing a porous film preferably includes a step for kneading a varnish containing fine particles and at least one resin selected from the group consisting of polyvinylidene fluoride, polyether sulfone, polyamic acid, polyimide, polyamide-imide precursor, and polyamide-imide. The varnish preferably has a viscosity at 25° C. of 0.1-3 Pa·s, a solids fraction concentration of 10-50 mass %, and a fine particle average particle size of 10-5000 nm.

16 Claims, 1 Drawing Sheet

(51) Int. Cl.

| | |
|---|---|
| *B01D 71/64* | (2006.01) |
| *B01D 71/68* | (2006.01) |
| *C08J 9/26* | (2006.01) |
| *C08J 9/00* | (2006.01) |
| *H01M 50/411* | (2021.01) |
| *H01M 50/446* | (2021.01) |
| *B01D 69/02* | (2006.01) |
| *B01D 69/12* | (2006.01) |
| *H01M 10/0525* | (2010.01) |

(52) U.S. Cl.
CPC ............ *B01D 69/12* (2013.01); *B01D 71/34* (2013.01); *B01D 71/64* (2013.01); *B01D 71/68* (2013.01); *C08J 9/0066* (2013.01); *C08J 9/26* (2013.01); *H01M 50/411* (2021.01); *H01M 50/446* (2021.01); *B01D 2325/021* (2013.01); *C08J 2201/044* (2013.01); *C08J 2327/16* (2013.01); *C08J 2379/08* (2013.01); *C08J 2381/06* (2013.01); *H01M 10/0525* (2013.01)

(58) Field of Classification Search
CPC ...... B01D 67/002; B01D 69/02; B01D 69/12; B01D 71/34; B01D 71/64; B01D 71/68; B01D 19/00; B01D 61/00; B01D 67/00; B01D 67/00; B01D 67/03; H01M 50/411; H01M 50/446; H01M 10/0525; H01M 50/403; H01M 50/46; C08J 9/0066; C08J 9/26; C08J 2201/044; C08J 2327/16; C08J 2379/08; C08J 2381/06; Y02E 60/10; C08L 79/08; C08L 81/06
See application file for complete search history.

(56) References Cited

U.S. PATENT DOCUMENTS

| | | | |
|---|---|---|---|
| 6,426,372 B1 | 7/2002 | Minami et al. | |
| 8,729,593 B2 * | 5/2014 | Nakamura | H01L 51/52 257/99 |
| 9,587,253 B2 * | 3/2017 | Sawai | C12M 29/04 |
| 10,090,512 B2 * | 10/2018 | Cui | H01M 4/1395 |
| 10,137,665 B2 * | 11/2018 | Noguchi | B32B 27/34 |
| 2002/0033367 A1 * | 3/2002 | Prince | A61M 1/34 210/650 |
| 2004/0012754 A1 | 1/2004 | Matsuno et al. | |
| 2005/0186109 A1 * | 8/2005 | Nakamura | G01N 31/22 422/400 |
| 2006/0062983 A1 * | 3/2006 | Irvin | H01L 51/5206 428/220 |
| 2008/0070112 A1 | 3/2008 | Kogetsu | |
| 2008/0171156 A1 * | 7/2008 | Olijve | B41M 5/5254 428/32.26 |
| 2013/0059192 A1 | 3/2013 | Kajita | |
| 2014/0275692 A1 * | 9/2014 | Patel | B01D 39/1623 585/818 |
| 2014/0339165 A1 * | 11/2014 | Han | B01D 67/003 210/650 |
| 2015/0007721 A1 | 1/2015 | Wünn et al. | |
| 2015/0246322 A1 * | 9/2015 | Larue | B01D 67/003 210/650 |
| 2016/0225754 A1 * | 8/2016 | Jang | H01L 27/11582 |
| 2016/0303518 A1 * | 10/2016 | Bano | B01D 71/42 |
| 2017/0203559 A1 * | 7/2017 | Noguchi | B32B 27/34 |
| 2017/0292000 A1 | 10/2017 | Furuyama et al. | |
| 2019/0203002 A1 | 7/2019 | Okamoto | |

FOREIGN PATENT DOCUMENTS

| | | | |
|---|---|---|---|
| JP | 2002-528561 | 9/2002 | |
| JP | 2008-104453 | 5/2008 | |
| JP | 2008-229612 | 10/2008 | |
| JP | 2012-107144 | 6/2012 | |
| JP | 5605566 | 10/2014 | |
| JP | 2015-505725 | 2/2015 | |
| JP | 2015-52107 | 3/2015 | |
| JP | 2016-65139 | 4/2016 | |
| WO | 2007/097260 | 8/2007 | |
| WO | WO-2007097260 A1 * | 8/2007 | ............... C12P 7/50 |
| WO | 2016/047140 | 3/2016 | |
| WO | WO-2016047140 A1 * | 3/2016 | ............... C08J 9/00 |

OTHER PUBLICATIONS

Notification of Reasons for Refusal dated Oct. 23, 2019 in Japanese Patent Application No. 2017-538087.

* cited by examiner

POROUS FILM AND METHOD FOR PRODUCING SAME

TECHNICAL FIELD

The present invention relates to a porous film and a method for producing the same.

BACKGROUND ART

Conventionally, various porous films have been used for a filter and the like. Furthermore, in recent years, application of porous films to separators for secondary batteries such as a lithium battery has been progressed.

Examples of the well-known method for producing a polyimide porous film include a method which includes applying a varnish obtained by dispersing silica particles in a solution of polyamide acid or polyimide onto a substrate to form a coating film, then heating the coating film as necessary so as to obtain a polyimide film containing silica particles, and then removing silica in the polyimide film by elution using a hydrogen fluoride solution so as to make the film porous (see Patent Document 1).

Patent Document 1: Japanese Patent No. 5605566

DISCLOSURE OF THE INVENTION

Problems to be Solved by the Invention

As the above-mentioned porous film, a porous film having smooth surface is required. For example, in use of a separator for a secondary battery, by allowing a separator and an electrode to satisfactorily adhere to each other, the battery performance is improved. When a surface of a porous film to be used as a separator is smooth, satisfactory adhesion between the separator and the electrode is achieved. Furthermore, in a filter as a film for separation of gas or liquid, a porous film and a support for supporting the porous film are desired to satisfactorily adhere to each other. When the porous film and the support satisfactorily adhere to each other, separation performance and handling property of a filter are improved. When a surface of a porous film is smooth, the permeation property (liquid permeation property) of the porous film is improved and handling also becomes good.

The present invention has been made in view of the above-mentioned circumstances, and an object of the present invention is to provide a porous film having excellent surface smoothness and a method for producing the porous film.

Means for Solving the Problems

In order to solve the above-mentioned problems, the present inventors have conducted extensive studies. As a result, they have found that a porous film having excellent surface smoothness can be obtained by adjusting conditions such as kneading time in the production conditions of a varnish to be used for producing a porous film, and they have completed the present invention.

A first embodiment of the present invention relates to a porous film of polyvinylidene fluoride, polyethersulfone, polyimide and/or polyamide-imide, wherein the surface roughness Ra is 30000 Å or less.

A second embodiment of the present invention relates to a porous film of polyvinylidene fluoride, polyethersulfone, polyimide and/or polyamide-imide, wherein the porous film includes a structure in which spherical pores communicate with each other, no waviness is deeper than a recess formed by an opening portion, and a diameter of the opening portion is 100 nm to 5000 nm.

A third embodiment of the present invention relates to a method for producing a porous film of polyvinylidene fluoride, polyimide and/or polyamide-imide, the method including a step of kneading a varnish containing fine particles and a resin such that surface roughness Ra of an unburned composite film containing the fine particles, and at least one resin selected from the group consisting of polyvinylidene fluoride, polyethersulfone, polyamide acid, polyimide, a polyamide-imide precursor and polyamide-imide is 30000 Å or less.

A fourth embodiment of the present invention relates to a method for producing a porous film of polyvinylidene fluoride, polyethersulfone, polyimide and/or polyamide-imide, the method comprising a step of kneading a varnish containing fine particles, and at least one resin selected from the group consisting of polyvinylidene fluoride, polyethersulfone, polyamide acid, polyimide, a polyamide-imide precursor and polyamide-imide, wherein the varnish has a viscosity at 25° C. of 0.1 to 3 Pa·s, the solid content concentration of 10 to 50% by mass, and the average particle diameter of the fine particles of 10 to 5000 nm, and the kneading is carried out for 2 minutes to 10 hours.

Effects of the Invention

The present invention can provide a porous film having excellent surface smoothness and a method for producing the same.

PREFERRED MODE FOR CARRYING OUT THE INVENTION

Figure 1:
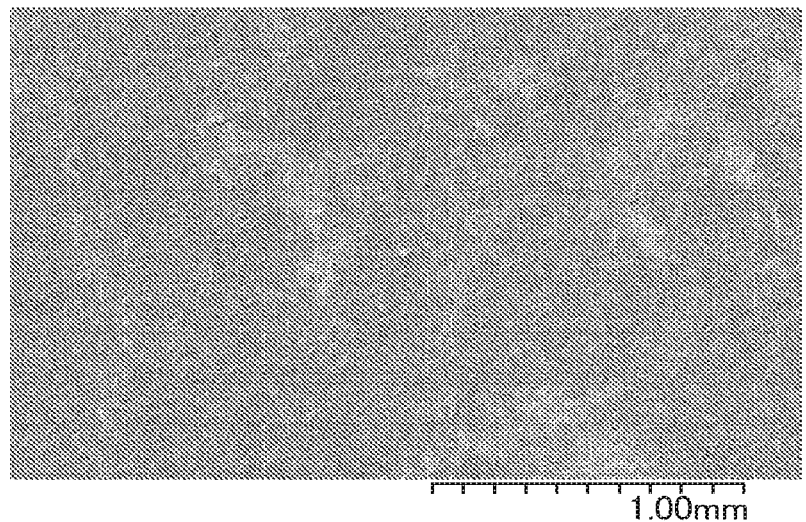
FIG. 1 shows an electron microscope image of a porous film obtained in Example 1.

Hereinafter, embodiments of the present invention will be described in detail, but the present invention is not necessarily limited to the following embodiments and can be implemented with appropriate modifications within the purpose of the present invention.

<<Porous Film of Polyvinylidene Fluoride, Polyethersulfone, Polyimide and/or Polyamide-Imide>>

A porous film includes polyvinylidene fluoride, polyethersulfone, polyimide and/or polyamide-imide. The surface roughness Ra of the porous film is 30000 Å or less, preferably 10000 Å or less, more preferably 5000 Å or less, and further preferably 3500 Å or less. Therefore, the porous film has excellent smoothness.

When the surface roughness Ra of the porous film is more than 30000 Å, convection occurs in an unburned composite film including fine particles and a resin. Accordingly, the value of surface roughness of the unburned composite film is increased in many cases. When the convection occurs in the unburned composite film, distribution of fine particles in the unburned composite film tends to be inconsistent. For example, in the unburned composite film, fine particles are dense in a portion that is a valley portion having smaller thickness while fine particles are non-dense in a portion that is a mountain portion having larger thickness; fine particles are non-dense in a mountain portion while fine particles are dense in a valley portion. In this case, as a result of removing fine particles from the unburned composite film to form a porous film, a porous film having variation in distribution of openings is obtained. On the contrary, when the surface roughness of the porous film is 30000 Å or less, convection does not occur or only mild convection occurs in many cases in an unburned composite film including fine particles and a resin. As a result, in a case where the surface roughness of a porous film is 30000 Å or less, a porous film in which distribution of openings in the surface is uniform is easily obtained.

Furthermore, when the surface roughness Ra is in the above-mentioned range, when the porous film is used as a separator of a battery, the porous film satisfactorily adheres to an electrode. Furthermore, the surface roughness Ra in the above-mentioned range improves permeation property of the porous film when the porous film is used as a filter. When the porous film as a filter adheres to a support, peeling of the support of the filter is suppressed when filtering is carried out, and accordingly rupture in the filter and other breakages are also suppressed, and the handling property is improved.

In claims and specification of the present application, the surface roughness Ra is a value measured using a stylus type surface roughness meter according to the following conditions. As the stylus type surface roughness meter, Dektak150 manufactured by Ulvac Inc. can be used. Stylus radius: 12.5 μm Measurement distance: 10000 μm
Measurement time: 120 seconds
Horizontal resolution: 0.278 μm/sample
Stylus pressure: 5.00 mg Furthermore, the porous film includes a structure in which spherical pores communicate with each other (hereinafter, abbreviated as a "continuous pore"). Note here that this porous film is produced as a film formed on a substrate as mentioned later. The surface of the porous film is a surface opposite to the surface facing the substrate at the time of production. An opening portion in the porous film is referred to as a portion in which the above-mentioned continuous pore is opened on the surface of the porous film. Preferably, the porous film does not have waviness in the surface thereof. The waviness is referred to as "a recess portion that is deeper than a recess formed by an opening portion" in the surface in which the surface roughness is measured. The recess formed by the opening portion corresponds to a spherical pore formed in the surface of a film when the porous film is produced. A recess portion that is deeper than the depth from the film surface of the spherical pore corresponds to the waviness.

The spherical shape with respect to a pore shape includes a true-spherical shape, but it is not necessarily limited to a true-spherical shape. The spherical shape is only required to be a substantially true-spherical shape, and shapes that can be recognized to be substantially a true-spherical shape when an enlarged image of a pore part is visually observed is also included in spherical shapes. Specifically, in a spherical pore, a surface that defines a pore part is a curved surface, and a true-spherical shape or substantially a true-spherical shape are only required to be defined by the curved surface.

Typically, individual spherical pores are formed in the post step by removing individual fine particles existing in the below-mentioned resin-fine particle composite film. The continuous pore is formed in the post step by removing a plurality of fine particles that are present in contact with each other in resin-fine particle composite film in the below-mentioned method for producing a porous film. A section in which spherical pores communicate with each other in the continuous pore is derived from a section in which a plurality of fine particles before being removed are brought into contact with each other.

A diameter of the opening portion in the porous film may be appropriately varied in range of, for example, 100 nm to 5000 nm depending on the applications of use of the porous film. In separator applications, the diameter is preferably 100 to 2000 nm, more preferably 200 to 1000 nm, and further preferably 300 to 900 nm. The diameter of the opening portion is equal or substantially equal to the diameter of a spherical pore constituting the continuous pore. The continuous pore formed by linking spherical pores each having such a diameter satisfactorily allows fluid to pass through the porous film. The porous film has a continuous pore inside thereof as a fluid flow passage penetrating in a thickness direction of the porous film. This enables a fluid to penetrate from one main surface to the other main surface of the porous film. Furthermore, when a laminated body is used as a filter, a fluid passes through the inside of a porous film while it is brought into contact with curved surfaces defining individual spherical pores. The contact area of the fluid inside the porous film is relatively large because a continuous pore of spherical pores is provided. Therefore, when a fluid is allowed to pass through a laminated body including a porous film, it is considered that minute substances that are present in the fluid are easily adsorbed to spherical pores in the porous film.

<<Varnish for Producing Porous Film>>

For production of the porous film mentioned above, a varnish for producing a porous film (hereinafter, which may be simply referred to as a "varnish") is used. The varnish contains predetermined fine particles, a resin, and a solvent, and the resin is dissolved in a solvent. The varnish is typically produced by a fine particle dispersion liquid preparation step of dispersing fine particles into a solvent; a step of preparing a resin solution containing at least one resin selected from the group consisting of polyvinylidene fluoride, polyethersulfone, polyamide acid, polyimide, polyamide acid that is to be a polyamide-imide precursor, and polyamide-imide, and a kneading step of kneading the fine particle dispersion liquid and the resin solution together so as to adjust the concentration.

In the varnish, it is preferable that a viscosity at 25° C. is 0.1 to 3 Pa·s or more, a solid content concentration is 10 to 50% by mass, and an average particle diameter of fine particles is 10 to 5000 nm. The varnish is preferably produced by kneading for, preferably two minutes to ten hours, and more preferably two minutes to 60 minutes. Note here that the viscosity of the varnish is measured using an E-type viscometer. The varnish can be kneaded using a rotation-revolution type mixer (product name: "Awatori Rentarou" manufactured by Thinky Corporation), a planetary mixer, a beads mill, and the like. The viscosity of the varnish for producing a porous film and the solid content concentration are adjusted to the above-mentioned range, a porous film having a desired smoothness can be easily formed. When the varnish is kneaded for an appropriate range of time, a smooth porous film can be easily formed using the varnish. When the kneading time is not less than two minutes, a porous film formed using the varnish can easily achieve the desired smoothness having surface roughness Ra of 30000 Å or less. From the viewpoint of the throughput, the kneading time of the varnish is preferably not beyond 10 hours. Furthermore, use of fine particles having the above-mentioned range of average particle diameter enables an opening portion having a desirable size to be formed in a surface of a porous film, and enables a continuous pore in which spherical pores having a desirable size continue to be formed inside the porous film.

[Resin]

As mentioned above, the varnish includes at least one resin selected from the group consisting of polyvinylidene fluoride, polyethersulfone, polyamide acid, polyimide, a polyamide-imide precursor and polyamide-imide. Hereinafter, these resins will be described.

[Polyvinylidene Fluoride]

Polyvinylidene fluoride is not particularly limited as long as it can be dissolved in a solvent to be used for forming a varnish. The polyvinylidene fluoride may be a homopolymer or may be a copolymer (copolymerized product). Examples of constituent units to be copolymerized include ethylene, polychlorotrifluoroethylene, tetrafluoroethylene, hexafluoropropylene, or the like. The mass average molecular weight thereof is, for example, about 10,000 to 5,000,000.

[Polyethersulfone]

Polyethersulfone is not particularly limited as long as it can be dissolved in a solvent to be used for forming a varnish. The polyethersulfone can be appropriately selected depending on the applications of use of porous films to be produced, and it may be hydrophilic or may be hydrophobic. Furthermore, the polyethersulfone may be aliphatic polyethersulfone or may be aromatic polyethersulfone. The mass average molecular weight thereof is, for example, 5000 to 1,000,000, and preferably 10,000 to 300,000.

[Polyamide Acid]

The polyamide acid may be any one prepared by polymerizing appropriate tetracarboxylic dianhydride and diamine. The amounts of the tetracarboxylic dianhydride and the diamine to be used are not particularly limited, and the amount of the diamine is preferably 0.50 to 1.50 mol, more preferably 0.60 to 1.30 mol, and particularly preferably 0.70 to 1.20 mol, based on 1 mol of the tetracarboxylic dianhydride.

The tetracarboxylic dianhydride can be appropriately selected from tetracarboxylic dianhydrides that have been conventionally used as raw materials for synthesizing polyamide acids. The tetracarboxylic dianhydride may be an aromatic tetracarboxylic dianhydride or an aliphatic tetracarboxylic dianhydride, but from the viewpoint of the heat resistance of the resulting polyimide resin, an aromatic tetracarboxylic dianhydride is preferably used. One type of tetracarboxylic dianhydride may be used alone or may be used in a combination of two or more types thereof.

Preferred examples of the aromatic tetracarboxylic dianhydride include pyromellitic dianhydride, 1,1-bis(2,3-dicarboxyphenyl) ethane dianhydride, bis(2,3-dicarboxyphenyl) methane dianhydride, bis(3,4-dicarboxyphenyl)methane dianhydride, 3,3',4,4'-biphenyltetracarboxylic dianhydride, 2,3,3',4'-biphenyltetracarboxylic dianhydride, 2,2,6,6-biphenyltetracarboxylic dianhydride, 2,2-bis(3,4-dicarboxyphenyl)propane dianhydride, 2,2-bis(2,3-dicarboxyphenyl)propane dianhydride, 2,2-bis(3,4-dicarboxyphenyl)-1,1,1,3,3,3-hexafluoropropane dianhydride, 2,2-bis(2,3-dicarboxyphenyl)-1,1,1,3,3,3-hexafluoropropane dianhydride, 3,3',4,4'-benzophenonetetracarboxylic dianhydride, bis(3,4-dicarboxyphenyl)ether dianhydride, bis(2,3-dicarboxyphenyl)ether dianhydride, 2,2',3,3'-benzophenonetetracarboxylic dianhydride, 4,4-(p-phenylenedioxy) diphthalic dianhydride, 4,4-(m-phenylenedioxy)diphthalic dianhydride, 1,2,5,6-naphthalenetetracarboxylic dianhydride, 1,4,5,8-naphthalenetetracarboxylic dianhydride, 2,3,6,7-naphthalenetetracarboxylic dianhydride, 1,2,3,4-benzenetetracarboxylic dianhydride, 3,4,9,10-perylenetetracarboxylic dianhydride, 2,3,6,7-anthracenetetracarboxylic dianhydride, 1,2,7,8-phenanthrenetetracarboxylic dianhydride, 9,9-bisphthalic anhydride fluorene, and 3,3',4,4'-diphenylsulfonetetracarboxylic dianhydride. Examples of the aliphatic tetracarboxylic dianhydride include ethylenetetracarboxylic dianhydride, butanetetracarboxylic dianhydride, cyclopentanetetracarboxylic dianhydride, cyclohexanetetracarboxylic dianhydride, 1,2,4,5-cyclohexanetetracarboxylic dianhydride, and 1,2,3,4-cyclohexanetetracarboxylic dianhydride. Among them, 3,3',4,4'-biphenyltetracarboxylic dianhydride and pyromellitic dianhydride are preferred because of their inexpensiveness and ready availability. One type of tetracarboxylic dianhydride may be used alone or as a mixture of two or more types thereof.

The diamine can be appropriately selected from diamines that have been conventionally used as raw materials for synthesizing polyamide acids. The diamine may be an aromatic diamine or an aliphatic diamine, but from the viewpoint of the heat resistance of the resulting polyimide resin, an aromatic diamine is preferred. One type of these diamine may be used alone or in a combination of two or more types thereof.

Examples of the aromatic diamine include diamino compounds having one phenyl group or about two to ten phenyl groups. Specifically, examples of the aromatic diamine include phenylenediamines and their derivatives, diaminobiphenyl compounds and their derivatives, diaminodiphenyl compounds and their derivatives, diaminotriphenyl compounds and their derivatives, diaminonaphthalenes and their derivatives, aminophenylaminoindanes and their derivatives, diaminotetraphenyl compounds and their derivatives, diaminohexaphenyl compounds and their derivatives, and cardo-type fluorenediamine derivatives.

The phenylenediamines are, for example, m-phenylenediamine and p-phenylenediamine. The phenylenediamine derivatives are diamines to which alkyl groups, such as a methyl group or an ethyl group, are bound, such as 2,4-diaminotoluene and 2,4-triphenylenediamine.

In the diaminodiphenyl compounds, two aminophenyl groups are bonded to each other. For example, the diaminodiphenyl compounds are 4,4'-diaminobiphenyl and 4,4'-diamino-2,2'-bis(trifluoromethyl)biphenyl.

The diaminodiphenyl compound is a compound obtained by linkage of two aminophenyl groups at their phenyl groups via another group. The linkage is, for example, an ether linkage, a sulfonyl linkage, a thioether linkage, a linkage of an alkylene or its derivative group, an imino linkage, an azo linkage, a phosphine oxide linkage, an amide linkage, or an ureylene linkage. The number of carbon atoms of the alkylene linkage is about 1 to 6. The derivative groups is an alkylene group whose one or more hydrogen atoms have been replaced by, for example, halogen atoms.

Examples of the diaminodiphenyl compounds include 3,3'-diaminodiphenyl ether, 3,4'-diaminodiphenyl ether, 4,4'-diaminodiphenyl ether, 3,3'-diaminodiphenyl sulfone, 3,4'-diaminodiphenyl sulfone, 4,4'-diaminodiphenyl sulfone, 3,3'-diaminodiphenyl methane, 3,4'-diaminodiphenyl methane, 4,4'-diaminodiphenyl methane, 4,4'-diaminodiphenyl sulfide, 3,3'-diaminodiphenyl ketone, 3,4'-diaminodiphenyl ketone, 2,2-bis(p-aminophenyl)propane, 2,2'-bis(p-aminophenyl)hexafluoropropane, 4-methyl-2,4-bis(p-aminophenyl)-1-pentene, 4-methyl-2,4-bis(p-aminophenyl)-2-pentene, iminodianiline, 4-methyl-2,4-bis(p-aminophenyl)pentane, bis(p-aminophenyl)phosphine oxide, 4,4'-diaminoazobenzene, 4,4'-diaminodiphenylurea, 4,4'-diaminodiphenylamide, 1,4-bis(4-aminophenoxy)benzene, 1,3-bis(4-aminophenoxy)benzene, 1,3-bis(3-aminophenoxy)benzene, 4,4'-bis(4-aminophenoxy)biphenyl, bis[4-(4-aminophenoxy)phenyl] sulfone, bis[4-(3-aminophenoxy)phenyl] sulfone, 2,2-bis[4-(4-aminophenoxy)phenyl]propane, and 2,2-bis[4-(4-aminophenoxy)phenyl]hexafluoropropane.

Among these, p-phenylenediamine, m-phenylenediamine, 2,4-diaminotoluene, and 4,4'-diaminodiphenylether are preferred because of their inexpensiveness and ready availability.

The diaminotriphenyl compound is formed by linkage of two aminophenyl groups and one phenylene group, all of which are each linked through another group. The "another group" is selected from the same groups as in the diaminodiphenyl compounds. Examples of the diaminotriphenyl compounds include 1,3-bis(m-aminophenoxy)benzene, 1,3-bis(p-aminophenoxy)benzene, and 1,4-bis(p-aminophenoxy)benzene.

Examples of the diaminonaphthalenes include 1,5-diaminonaphthalene and 2,6-diaminonaphthalene.

Examples of the aminophenylaminoindanes include 5- or 6-amino-1-(p-aminophenyl)-1,3,3-trimethylindane.

Examples of the diaminotetraphenyl compounds include 4,4'-bis(p-aminophenoxy)biphenyl, 2,2'-bis[p-(p'-aminophenoxy)phenyl]propane, 2,2'-bis[p-(p'-aminophenoxy)biphenyl]propane, and 2,2'-bis[p-(m-aminophenoxy)phenyl]benzophenone.

An example of the cardo-type fluorenediamine derivatives is 9,9-bisanilinefluorene.

The number of carbon atoms of aliphatic diamine is, for example, about 2 to 15. Specific examples of aliphatic diamine include pentamethylenediamine, hexamethylenediamine, and heptamethylenediamine.

Note here that hydrogen atoms of these diamines may be a compound having at least one substituent selected from the group consisting of halogen atoms and methyl, methoxy, cyano, and phenyl groups.

There is no particular limitation to means for producing the polyamide acid, and, for example, well-known technique such as a method for reacting an acid and a diamine component in a solvent can be used.

The reaction of a tetracarboxylic dianhydride and a diamine is usually performed in a solvent. The solvent to be used for the reaction of a tetracarboxylic dianhydride and a diamine is not particularly limited and may be any solvents that can dissolve the tetracarboxylic dianhydride and the diamine without reacting with the tetracarboxylic dianhydride and the diamine. One type of solvent may be used alone or in a combination of two or more types thereof.

Examples of the solvent to be used for the reaction of a tetracarboxylic dianhydride and a diamine include nitrogen-containing polar solvents, such as N-methyl-2-pyrrolidone, N,N-dimethyl acetamide, N,N-diethylacetamide, N,N-dimethylformamide, N,N-diethylformamide, N-methylcaprolactam, and N,N,N',N'-tetramethylurea; lactone polar solvents, such as β-propiolactone, γ-butyrolactone, γ-valerolactone, δ-valerolactone, γ-caprolactone, and ε-caprolactone; dimethyl sulfoxide; acetonitrile; fatty acid esters, such as ethyl lactate and butyl lactate; ethers, such as diethylene glycol dimethyl ether, diethylene glycol diethyl ether, dioxane, tetrahydrofuran, methyl cellosolve acetate, and ethyl cellosolve acetate; and phenol solvents, such as cresols and xylene-based mixed solvent. One type of these solvents may be used alone or in a combination of two or more types thereof. The amount of the solvent to be used is not particularly limited but is desirably an amount such that the content of the resulting polyamide acid is 5% to 50% by mass.

Among these solvents, from the viewpoint of the solubility of the resulting polyamide acid, preferred are nitrogen-containing polar solvents, such as N-methyl-2-pyrrolidone, N,N-dimethyl acetamide, N,N-diethylacetamide, N,N-dimethylformamide, N,N-diethylformamide, N-methylcaprolactam, and N,N,N',N'-tetramethylurea.

The polymerization temperature is usually −10° C. to 120° C. and preferably 5° C. to 30° C. The polymerization time varies depending on the raw material composition to be used, and is usually 3 to 24 Hr (hours). One type of polyamide acid may be used alone or in a combination of two or more types thereof.

[Polyimide]

The polyimide can be any known polyimide, without any limitation to its structure and molecular weight. The side chain of the polyimide may have a condensable functional group, such as a carboxy group, or a functional group enhancing the cross-linking reaction during burning. Furthermore, when the varnish contains a solvent, the soluble polyimide that can be dissolved in a solvent used is preferable.

In order to make the polyimide soluble in a solvent, it is effective to use a monomer for introducing a flexible bend structure into the main chain, for example, to use an aliphatic diamine, such as ethylenediamine, hexamethylenediamine, 1,4-diaminocyclohexane, 1,3-diaminocyclohexane, or 4,4'-diaminodicyclohexylmethane; an aromatic diamine, such as 2-methyl-1,4-phenylenediamine, o-tolidine, m-tolidine, 3,3'-dimethoxybenzidine, or 4,4'-diaminobenzanilide; a polyoxyalkylenediamine, such as polyoxyethylenediamine, polyoxypropylenediamine, or polyoxybutyrenediamine; a polysiloxanediamine; 2,3,3',4'-oxydiphthalic anhydride, 3,4,3',4'-oxydiphthalic anhydride, or 2,2-bis(4-hydroxyphenyl)propanedibenzoate-3,3',4,4'-tetracarboxylic dianhydride. It is also effective to use a monomer containing a functional group for improving the solubility in a solvent, for example, to use a fluorinated diamine, such as 2,2'-bis(trifluoromethyl)-4,4'-diaminobiphenyl or 2-trifluoromethyl-1,4-phenylenediamine. Furthermore, in addition to the monomer for improving the solubility of the polyimide, a monomer that is mentioned in the paragraph describing the polyamide acid may be used within a range that does not inhibit the solubility. For each of polyimide and the monomer thereof, one type thereof may be used alone or in a combination of two or more types thereof.

There is no limitation to a method for producing polyimide. Polyimide may be produced by any well-known techniques, for example, chemically imidizing or thermally imidizing polyamide acid. Examples of such polyimides include aliphatic polyimide (full-aliphatic polyimides) and aromatic polyimides, and aromatic polyimides are preferable. The aromatic polyimide may be one prepared by a thermal or chemical ring-closing reaction of a polyamide acid having repeating units represented by Formula (1) or a polyimide having repeating units represented by Formula (2). In the formulae, Ar represents an aryl group. When the varnish contains a solvent, these polyimides may be then dissolved in a solvent to be used.

[Formula 1]

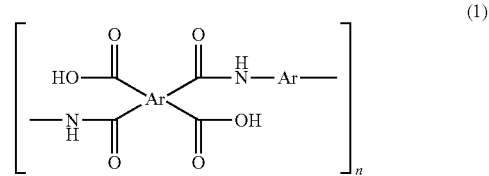

(1)

[Formula 2]

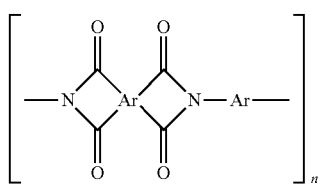

(2)

[Polyamide-Imide And Polyamide-Imide Precursor]

Any well-known polyamide-imides can be used without limitation to the structure or molecular weight. The side chain of the polyamide-imide may have a condensable functional group, such as a carboxy group, or a functional group enhancing the cross-linking reaction during burning. Furthermore, when the varnish contains a solvent, a soluble polyamide-imide that can be dissolved in a solvent to be used is preferable.

As the polyamide-imide, (i) a resin obtained by reacting an acid having a carboxyl group and an acid anhydride group with diisocyanate in one molecule of trimellitic anhydride and the like, (ii) a resin obtained by imidization of a precursor polymer obtained by reacting a reactive derivative of the acid such as trimellitic anhydride chloride and diamine (a polyamide-imide precursor) can be usually used without particular limitation.

Examples of the above-mentioned acids or the reactive derivatives include trimellitic anhydride, trimellitic anhydride halides such as trimellitic anhydride chloride, trimellitic anhydride esters, and the like.

Examples of the above-mentioned optional diamine include diamines described as an example in the description of the above-mentioned polyamide acid. A diaminopyridine compound can also be used.

The above mentioned any diisocyanate is not particularly limited, and includes, for example, a diisocyanate compound corresponding to the above-mentioned optional diamine can be used. Specific examples thereof include meta-phenylene diisocyanate, p-phenylene diisocyanate, o-tolidine diisocyanate, p-phenylene diisocyanate, m-phenylene diisocyanate, 4,4'-oxybis (phenyl isocyanate), 4,4'-diphenylmethane diisocyanate, bis[4-(4-isocyanate phenoxy) phenyl] sulfone, 2,2'-bis[4-(4-isocyanate phenoxy) phenyl] propane, 2,4-tolylene diisocyanate, 2,6-tolylene diisocyanate, 4,4'-diphenylmethane diisocyanate, 3,3'-dimethyldiphenyl-4,4'-diisocyanate, 3,3'-diethyldiphenyl-4,4'-diisocyanate, isophorone diisocyanate, hexamethylene diisocyanate, 4,4'-dicyclohexyl methane diisocyanate, m-xylene diisocyanate, p-xylene diisocyanate, naphtalen diisocyanate, and the like, can be exemplified.

As a raw material monomer of polyamide-imide, in addition to the above, it is possible to use compounds described as general formulae in Japanese Unexamined Patent Application, Publication No. S63-283705 and Japanese Unexamined Patent Application, Publication No. H2-198619. Furthermore, the imidization in the method described in the above (ii) may be any one of thermal imidization and chemical imidization. As the chemical imidization, a method of immersing an unburned composite film formed by using a varnish such as a polyamide-imide precursor in a mixed solvent including acetic anhydride, or acetic anhydride and isoquinoline, and the like can be used. Note here that the polyamide-imide precursor can be referred to as a polyimide precursor from the viewpoint that it is a precursor before imidization.

The polyamide-imide to be contained in a varnish may be the above-mentioned (1) a polymer obtained by reacting an acid such as trimellitic anhydride and diisocyanate with each other, (2) a polymer obtained by imidization of a precursor polymer obtained by reacting a reactive derivative of the above-mentioned acid such as trimellitic anhydride chloride and diamine with each other, or the like. The term "polyamide-imide precursor" in this specification and claims means a polymer before imidization (a precursor polymer). For each of polyamide-imide and polyamide-imide precursor, one type thereof may be used alone or in a combination of two or more types thereof. Furthermore, as the polyamide-imide, for each of the above-mentioned polymer, raw material monomer, and oligomer, one type thereof may be used alone or in a combination of two or more types thereof.

[Fine Particles]

The material of the fine particles is not particularly limited and may be any known material as long as the material is insoluble in the solvent contained in the varnish and can be removed later from resin-fine particle composite film. Examples of the inorganic material include metal oxides, such as silica (silicon dioxide), titanium oxide, and alumina ($Al_2O_3$). Examples of the organic materials include high-molecular-weight olefins (such as polypropylene and polyethylene) and organic polymer fine particles, such as polystyrenes, epoxy resins, celluloses, polyvinyl alcohols, polyvinyl butyrals, polyesters, and polyethers.

Specific examples of the fine particles include colloidal silica. In particular, it is preferable to select monodisperse spherical silica particles because uniform pores can be formed.

Furthermore, it is preferable that the fine particles preferably have a high sphericity and a low particle diameter distribution index. Fine particles satisfying these conditions show excellent dispersibility in the varnish and can be used without causing aggregation with one another. The average particle diameter of the fine particles is preferably 100 to 5000 nm. When such conditions are satisfied, the pore diameter of the porous film obtained by removing fine particles can be adjusted. In the case of a separator, fine particles having an average particle diameter of 100 to 2000 nm are preferably used, because electric field applied to the obtained porous film can be made uniform. One type of fine particle may be used alone or in a combination of two or more types thereof.

[Solvent]

Any solvents may be used as long as they can solve a resin which includes polyvinylidene fluoride, polyethersulfone, polyamide acid and/or polyimide and which does not solve fine particles. Examples of the solvent include solvents described as an example of a solvent to be used for reaction of tetracarboxylic dianhydride and diamine. One type of solvent may be used alone or in a combination of two or more types thereof. For polyvinylidene fluoride, examples of the solvent include lower alkylketone such as methyl ethyl ketone, acetone, and tetrahydrofuran, and trimethyl phosphate, and the like, in addition to the above-mentioned nitrogen-containing polarity solvent. For polyethersulfone, examples of the solvent include polar solvents such as diphenylsulfone, dimethylsulfone, dimethylsulfoxide, benzophenone, tetrahydrothiophene-1,1-dioxide, and 1,3-dimethyl-2-imidazolidinone, in addition to the above-mentioned nitrogen-containing polarity solvent.

[Dispersant]

In order to uniformly disperse fine particles in a varnish, a dispersant together with fine particles may be added. Addition of the dispersant allows further uniform mixing of the fine particles in a varnish, and further allows uniform dispersion of the fine particles in a film including a varnish. As a result, dense openings are provided on the surface of the finally obtained porous film, and the front and rear surfaces can be allowed to efficiently communicate with each other, thus improving the air permeability of the porous film. Furthermore, addition of the dispersant easily improves drying of the varnish, and easily improves peelability of the formed unburned composite film from a substrate and the like.

The dispersant is not particularly limited and any known dispersant may be used. Examples of the dispersant include, but not limited to, anionic surfactants, such as salts of coconut fatty acid, salts of sulfonated castor oil, lauryl sulfate, polyoxyalkylene allylphenyl ether sulfate, alkylbenzenesulfonic acid, alkylbenzene sulfonate, alkyldiphenyl ether disulfonate, alkylnaphthalene sulfonate, dialkyl sulfosuccinate, isopropyl phosphate, polyoxyethylene alkyl ether phosphate, and polyoxyethylene allylphenyl ether phosphate; cationic surfactants, such as oleylamine acetate, lauryl pyridinium chloride, cetyl pyridinium chloride, lauryl trimethylammonium chloride, stearyl trimethylammonium chloride, behenyl trimethylammonium chloride, and didecyl dimethylammonium chloride; amphoteric surfactants, such as coconut alkyl dimethylamine oxide, fatty acid amide propyl dimethyl amine oxide, alkyl polyaminoethyl glycine hydrochloride, amide betaine surfactant, alanine surfactant, and lauryl iminodipropionic acid; polyoxyalkylene primary alkyl ether or polyoxyalkylene secondary alkyl ether nonionic surfactants, such as polyoxyethylene octyl ether, polyoxyethylene decyl ether, polyoxyethylene lauryl ether, polyoxyethylene laurylamine, polyoxyethylene oleylamine, polyoxyethylene polystyryl phenyl ether, and polyoxyalkylene polystyryl phenyl ether; other polyoxyalkylene nonionic surfactants, such as polyoxyethylene dilaurate, polyoxyethylene laurate, polyoxyethylenated castor oil, polyoxyethylenated hydrogenated castor oil, sorbitan laurate, polyoxyethylene sorbitan laurate, and fatty acid diethanolamide; fatty acid alkyl esters, such as octyl stearate and trimethylolpropane tridecanoate; and polyether polyols, such as polyoxyalkylene butyl ether, polyoxyalkylene oleyl ether, and trimethylol propane tris(polyoxyalkylene) ether. These dispersants may be used as a mixture of two or more types thereof.

From the view point of, for example, the film formability, the content of the dispersant in the varnish is preferably 0.01 to 5% by mass, more preferably 0.05 to 1% by mass, and further more preferably 0.1 to 0.5% by mass, with respect to the mass of the fine particles.

<<Method for Producing Porous Film>>

A typical method for producing a porous film includes an unburned composite film forming step of forming an unburned composite film using a varnish; a burning step of burning the unburned composite film to obtain a resin-fine particle composite film; and a fine particle-removing step of removing the fine particles from the resin-fine particle composite film.

<Method for Producing Unburned Composite Film (Unburned Composite Film Forming Step)>

Hereinafter, a method for forming an unburned composite film will be described. In an unburned composite film forming step, an unburned composite film is formed using a varnish. At this time, the unburned composite film may be formed directly on a substrate or on a lower layer film that is different from the above-mentioned unburned composite film. Furthermore, after the unburned composite film is formed using the above-mentioned varnish (composition for producing a porous film), an upper layer film that is different from the above-mentioned unburned composite film may be further formed in the upper layer. Note here that in this application, both the method for providing a lower layer film on the substrate, and the method for forming an upper layer film that is different from the above-mentioned unburned composite film on the further upper layer by using the above-mentioned varnish after the unburned composite film is formed, are included in the method for forming an unburned composite film on the substrate. However, when the resin component contained in the above-mentioned varnish is polyamide acid or a polyamide-imide precursor, and when a material that does not need a burning step is used for the upper layer film, an upper layer film may be formed on the resin-fine particle composite film after burning may be formed. From the viewpoint that a porous film having a smooth surface whose surface roughness is small is easily formed, it is preferable that an unburned composite film made of the above-mentioned varnish is formed as a single layer on the substrate, or formed as an upper layer film on the lower layer film. The unburned composite film can be formed by, for example, applying the varnish onto the substrate or the lower layer film, and drying thereof at normal pressure or under vacuum at 0 to 100° C., and preferably at normal pressure at 10 to 100° C. Examples of the substrate include a PET film, a SUS substrate, a glass substrate, and the like.

Examples of the lower layer film (or an upper layer film) include a lower (or upper) layer unburned composite film formed using a varnish for forming a lower (or upper) layer film containing a resin including resin including polyvinylidene fluoride, polyethersulfone, polyamide acid and/or polyimide, fine particles, and a solvent, wherein the content of the fine particles is more than 40% by volume and not more than 81% by volume with respect to the total of the resin and the fine particles. The lower layer (or upper layer) unburned composite film may be formed on the substrate. When the content of the fine particles is more than 40% by volume, the particles are uniformly dispersed; and when the content of the fine particles is not more than 81% by volume, the particles are dispersed without causing aggregation of particles. Consequently, pores can be formed uniformly in the porous film. Furthermore, when the content of the fine particles is within the above-mentioned range, when the lower layer (or upper layer) unburned composite film is formed on the substrate, even when the substrate is not provided with a mold release layer in advance, mold releasability after film formation can be easily secured.

Note here that the fine particles to be used for the varnish for forming a lower (or upper) layer film and the fine particles to be used for the varnish for producing a porous film may be the same as or different from each other. In order to increase the density of pores in the lower (or upper) layer unburned composite film, it is preferable that the fine particles to be used for the varnish for forming the lower (or upper) layer film has a particle diameter distribution index that is equal to or smaller than that of the fine particles to be used for a varnish for producing a porous film. Alternatively, it is preferable that the fine particles to be used for a varnish for the lower (or upper) layer film has a sphericity that is equal to or smaller than that of the fine particles to be used for the varnish for producing a porous film.

Furthermore, the average particle diameter of fine particles to be used for the varnish for the lower (or upper) layer film may be the same as or different from the average particle diameter of the fine particles of the varnish for producing a porous film. The average particle diameter may be appropriately set to be in a range from 10 to 5000 nm depending on the application of use. In the present invention, when the varnish for the lower (or upper) layer film is used, it is preferable that the varnish for producing a porous film of the present invention is used for the upper layer, and a varnish for the lower layer film having different average particle diameter or a particle diameter distribution index of fine particles is used in combination.

Furthermore, the content of the fine particles to be used for the varnish for forming a lower (or upper) layer film may be larger or smaller than that of the above-mentioned varnish. Suitable examples of the components such as a resin component, fine particles, and a solvent included in the varnish for forming a lower (or upper) layer film are the same as those in the above-mentioned varnish. The varnish for forming a lower (or upper) layer film can be prepared by the same method as that of the above-mentioned varnish. The lower layer unburned composite film can be formed by, for example, applying the varnish for a lower layer film onto the substrate, followed by drying at normal pressure or under vacuum at 0 to 100° C., and preferably at normal pressure at 10 to 100° C. The same is true to the film formation conditions of the upper layer unburned composite film.

Furthermore, examples of the lower (or upper) layer film include lower layer films made of fiber materials such as cellulose resin, non-woven fabric (for example, polyimide non-woven fabric or the like; a fiber diameter is, for example, about 50 nm to about 3000 nm), and a polyimide film.

Furthermore, a burning step of burning the unburned composite film or a laminated film of the unburned composite film and the lower (or upper) layer film to obtain a polyimide-fine particle composite film is carried out. When the unburned composite film or the lower layer unburned composite film is formed on the substrate, burning may be carried out as it is, or the unburned composite film or the laminated film of the unburned composite film and the lower unburned composite film may be peeled off from the substrate before carrying out the burning step.

Note here that when the above-mentioned lower (or upper) layer film in a laminated film is a lower (or upper) layer unburned composite film formed using a varnish for forming a lower (or upper) layer film, and the composition of the varnish for forming a lower (or upper) layer film is the same as the composition of the varnish for producing a porous film to be used for formation of the above-mentioned unburned composite film, the laminated film of the above-mentioned unburned composite film and the above-mentioned lower (or upper) layer film is substantially one layer (single layer), but in this specification, it is referred to as a laminated film.

When the unburned composite film or the laminated film of the unburned composite film and the lower (or upper) layer unburned composite film is peeled off from the substrate, the substrate provided with a mold release layer in advance can also be used in order to further enhance the releasability of the film. In a case of providing the substrate with a mold release layer in advance, the mold release agent is applied onto the substrate and is dried or baked before the application of the varnish. The mold release agent used here may be a known mold release agent, such as an alkylphosphate ammonium salt-based or fluorine-based agent or silicon, without particular restrictions. When the dried unburned composite film is peeled off from the substrate, a slight amount of the mold release agent remains on the surface of the peeled unburned composite film and may lead to discoloration during burning and adverse effects on the electrical characteristics. The mold release agent should therefore be removed as much as possible. In order to remove the mold release agent, a washing step of washing the unburned composite film or the laminated film of the unburned composite film and the lower layer unburned composite film peeled off from the substrate with an organic solvent may be introduced.

Alternatively, when the substrate is directly used, as it is, without providing a mold release layer in formation, of the unburned composite film or the lower layer unburned composite film, the step of forming the mold release layer and the washing step can be omitted. Furthermore, in the production of an unburned composite film, before the below-mentioned burning step, an immersion step into a water-containing solvent, a pressing step, and a drying step after the immersion step may be optionally provided.

<Production of Resin-Fine Particle Composite Film (Burning Step)>

When a resin component contained in a varnish is polyamide acid or a polyamide-imide precursor, the unburned composite film is subjected to heat treatment as post-treatment (burning) to be formed into a composite film (resin-fine particle composite film) composed of resin made of polyimide and/or polyamide-imide and fine particles. Note here that when the resin component contained in a varnish is polyimide, polyamide-imide or polyethersulfone, a burning step may not be carried out. In the unburned composite film forming step, when the unburned composite film is formed on a lower layer film that is different from the unburned composite film, the lower layer film together with the unburned composite film is burned in the burning step. The burning temperature in the burning step varies depending on the structures of the unburned composite film and the lower layer film and the presence or absence of a condensing agent, but the temperature is preferably 120° C. to 450° C., and more preferably 150° C. to 400° C. In a case of using an organic material for the fine particles, the burning temperature need to be set to a temperature lower than the thermal decomposition temperature of the organic material. When the resin component contained in the varnish is polyamide acid, in the burning step, imidization is preferably completed.

The burning can be performed by, for example, a method of increasing the temperature from room temperature to 400° C. over three hours and then holding 400° C. for 20 minutes or a method of stepwise drying-thermal imidization by stepwise increasing the temperature by 50° C. from room temperature to 400° C. (holding the temperature of each step for 20 minutes) and finally holding 400° C. for 20 minutes. When the unburned composite film is formed on the substrate and the unburned composite film is peeled from the substrate once, an end of the unburned composite film may be fixed to, for example, a frame made of SUS stainless steel to prevent deformation.

The thickness of the resulting resin-fine particle composite film can be determined by, for example, measuring the thicknesses of a plurality of positions with a micrometer or the like and averaging the thicknesses. Preferred average thickness varies depending on the application of use of porous film, however, is preferably 5 to 500 μm and more preferably 10 to 100 μm, and further preferably 15 to 30 μm in the use as a separator. The average thickness is preferably 5 to 500 µm and more preferably 10 to 300 µm, and further preferably 20 to 150 µm in the use as a filter or the like.

<Porosification of Resin-Fine Particle Composite Film (Fine Particle-Removing Step)>

The porous film can be produced with high reproducibility by selecting an appropriate method for removing the fine particles from the resin-fine particle composite film.

For example, when silica is employed as the material of the fine particles, the silica can be removed by treating the resin-fine particle composite film with, for example, a low-concentration hydrogen fluoride solution to dissolve the silica.

An organic material can also be selected as the material of the fine particles. Any organic material, which is decomposed at a temperature lower than resin contained in the resin-fine particle composite film, may be used, without particular limitation. Examples thereof include resin fine particles composed of linear polymers and known depolymerizable polymers. The linear polymer usually has a molecular chain that is randomly cleaved during thermal decomposition; and the depolymerizable polymer is decomposed into a monomer during thermal decomposition. Both of them are decomposed into a low molecular weight substance or to $CO_2$ and disappear from the porous film. A decomposition temperature of the resin fine particles to be used is preferably 200° C. to 320° C. and more preferably 230° C. to 260° C. A decomposition temperature of 200° C. or more allows formation of a film even if the varnish contains a high boiling point solvent and broadens the selection of burning conditions of the resin-fine particle composite film. Furthermore, a decomposition temperature of less than 320° C. allows the resin fine particles alone to disappear without thermally damaging resin contained in the resin-fine particle composite film.

The total thickness of the porous film is not particularly limited, and is preferably 5 µm to 500µm, more preferably 10 µm to 100µm, and further preferably 15 µm to 30 µm, when, for example, the porous film is used for a separator or the like. The thickness is preferably 5 µm to 500 µm, more preferably 10 µm to 300 µm, and further preferably 20 µm to 150 µm, when, for example, the porous film is used for a filter or the like. Similar to the measurement of the resin-fine particle composite film, the above-mentioned thickness can be determined by, for example, measuring thicknesses of a plurality of positions with a micrometer or the like and averaging the thicknesses.

When the porous film is formed of two or more types of compositions for producing a porous film, or when it is manufactured by combination with a layer by the other composition for producing a porous film by a preparation method that is different from the manufacturing method of the present invention, the ratio in the thickness direction of the region formed by each composition for producing a porous film may be appropriately determined depending on the application of use of the porous film. When a porous film has two regions, that is, a layer (I) by composition for producing a porous film according to the present invention and a layer (II) by the other composition for producing a porous film that is different from the manufacturing method according to the present invention, the ratio ((I):(II)) of each region in the thickness direction may be adjusted to, for example, 1:99 to 99:1, preferably 5:95 to 95:5. The thickness of each layer can be calculated by averaging thicknesses at a plurality of positions in a cross section of the porous film by observing under, for example, a scanning electron microscope (SEM).

<Resin-Removing Step>

A method for producing a porous film may include a resin-removing step of removing at least a part of a resin portion of a resin-fine particle composite film before the fine particle-removing step, or removing at least a part of the porous film after the fine particle-removing step. When at least a part of a resin portion of the resin-fine particle composite film is removed before the fine particle-removing step and when the fine particles are removed and pores are formed in the subsequent fine particle-removing step, the opening rate and the surface smoothness of the porous film of the final product can be improved as compared with the case where at least a part of the resin portion is not removed. Furthermore, when at least a part of the porous film is removed after the fine particle-removing step, the opening rate of the porous film of the final product can be improved as compared with the case where at least a part of the porous resin film is not removed.

The step of removing at least a part of the resin portion or the step of removing at least a part of the porous film can be carried out by a usual chemical etching or physical removing method, or a method combining these methods.

The chemical etching method includes treatment using a chemical etchant such as an inorganic alkaline solution or an organic alkaline solution. An inorganic alkaline solution is preferable. Examples of the inorganic alkaline solution include a hydrazine solution including hydrazine hydrate and ethylenediamine; a solution of alkaline metal hydroxide such as potassium hydroxide, sodium hydroxide, sodium carbonate, sodium silicate, and sodium metasilicate; an ammonium solution; an etchant including alkali hydroxide, hydrazine, and 1,3-dimethyl-2-imidazolidinone as a main component, or the like. Examples of the organic alkaline solution include an alkaline solution of primary amines such as ethyl amine and n-propyl amine; secondary amines such as diethyl amine and di-n-butylamine; tertiary amines such as triethylamine and methyl diethyl amine; alcohol amines such as dimethyl ethanol amine and triethanolamine; quaternary ammonium salts such as tetramethylammonium hydroxide and tetraethylammonium hydroxide; cyclic amines such as pyrrole and piperidine, or the like.

As a solvent for each solution, pure water and alcohols can be appropriately selected. Furthermore, solvents in which an appropriate amount of surfactant is added can be used. An alkali concentration is, for example, 0.01 to 20% by mass.

Furthermore, examples of the physical method include dry etching by plasma (oxygen, argon, etc.), corona discharge, or the like, a method for treating a surface of a film by dispersing abrasives (for example, alumina (rigidity 9), or the like) in a liquid and irradiating the surface of a film with the liquid at the irradiation rate of 30 to 100 m/s, and the like.

The above-mentioned methods are preferable because they are applicable to the resin-removing step both before and after the fine particle-removing step.

On the other hand, as the physical method that can be applied only to the resin-removing step carried out after the fine particle-removing step, a method of compression bonding a mount film (for example, a polyester film such as a PET film) whose subject surface is wetted with liquid and then peeling a porous film from the mount film after drying or without drying can be employed. Due to the surface tension of the liquid or electrostatic adhesion, the porous film is peeled from the mount film with only the surface layer of the porous film left on the mount film.

<<Use of Porous Film>>

The porous film described above can be used as a separator for a lithium-ion battery, an electrolyte film of a fuel cell, a separation film for a gas or liquid, and low dielectric constant materials. The above-mentioned porous film can be used as separators for secondary batteries such as a nickel cadmium battery, nickel hydrogen battery, and lithium ion secondary battery, and particularly preferably as a porous separator for a lithium ion secondary battery. In particular, when the porous film is used for a separator for a lithium-ion battery, in the above-mentioned unburned composite film formation step, the above-mentioned unburned composite film is formed on a lower layer film that is different from the above-mentioned unburned composite film, wherein a film formed by using the above-mentioned varnish for lower layer film is used as the above-mentioned lower film, and a surface at the lower layer film side is defined as a negative electrode surface side of lithium-ion battery, thus improving the battery performance.

<Secondary Battery>

In a secondary battery, an electrolytic solution and a separator made of the above-mentioned porous film are disposed between a negative electrode and a positive electrode. The secondary battery may be of any type and may have any configuration without limitation. Any secondary batteries can be employed with no particular limitation in known secondary batteries such as nickel cadmium and nickel hydrogen batteries and a lithium ion secondary battery, as long as the battery has a configuration in which a battery element including a positive electrode, a separator, and a negative electrode being laminated in this order so as to satisfy the above-described requirements is impregnated with an electrolytic solution and encapsulated in an outer package.

The negative electrode of the secondary battery can have a structure in which a negative electrode mixture composed of a negative electrode active material, a conductive auxiliary agent, and a binder is formed on a current collector. For example, as the negative electrode active material, cadmium hydroxide can be used in nickel cadmium batteries, and a hydrogen-occlusion alloy can be used in nickel hydrogen batteries. In lithium ion secondary batteries, a material that can be electrochemically doped with lithium can be employed. Examples of such active materials include carbon materials, silicon, aluminum, tin, and Wood's alloy.

Examples of the conductive auxiliary agent constituting the negative electrode include carbon materials such as acetylene black and Ketjen black. The binder is composed of an organic polymer, and examples thereof include polyvinylidene fluoride and carboxymethyl cellulose. The current collector can be, for example, copper foil, stainless steel foil, nickel foil, or the like.

The positive electrode can have a structure in which a positive electrode mixture composed of a positive electrode active material, a conductive auxiliary agent, and a binder is formed on a current collector. For example, as the positive electrode active material, nickel hydroxide can be used in nickel cadmium batteries, and nickel hydroxide or nickel oxyhydroxide can be used in nickel hydrogen batteries, respectively. Meanwhile, in lithium ion secondary batteries, examples of the positive electrode active material include lithium-containing transition metal oxides, specifically, $LiCoO_2$, $LiNiO_2$, $LiMn_{0.5}Ni_{0.5}O_2$, $LiCo_{1/3}Ni_{1/3}Mn_{1/3}O_2$, $LiMn_2O_4$, $LiFePO_4$, $LiCo_{0.5}Ni_{0.5}O_2$, $LiAl_{0.25}Ni_{0.75}O_2$. Examples of the conductive auxiliary agent include carbon materials such as acetylene black and Ketjen black. The binder is made of an organic polymer, and examples thereof include polyvinylidene fluoride. The current collector can be, for example, aluminum foil, stainless steel foil, or titanium foil.

As the electrolytic solution, a potassium hydroxide solution is used in, for example, a nickel cadmium battery or a nickel hydrogen battery. The electrolytic solution in a lithium ion secondary battery is composed by dissolving a lithium salt in a non-aqueous solvent. Examples of the lithium salt include $LiPF_6$, $LiBF_4$, $LiClO_4$ and the like. Examples of the non-aqueous solvent include propylene carbonate, ethylene carbonate, dimethyl carbonate, diethyl carbonate, ethyl methyl carbonate, γ-butyrolactone, and vinylene carbonate. These solvents may be used alone or as a mixture.

Examples of the outer package material include metal cans and aluminum laminate packs. The shape of the battery is, for example, a rectangular shape, a cylindrical shape, or a coin shape; however, the separator made of the porous film mentioned above can be suitably applied to any shapes.

EXAMPLES

The present invention will now be more specifically described with reference to Examples, but the scope of the present invention is not limited to the following examples.

Example 1 and Comparative Examples 1

Silica dispersion liquid (including 0.5% by mass dispersant with respect to silica) was added to a polyamide acid solution so that the amount of polyamide acid was 20% by mass and the mass of silica was 80% by mass with respect to the total mass of polyamide acid and silica. Furthermore, organic solvents (1) and (2) were respectively added so that the solvent composition in the final composition became the ratio of the organic solvent (1) to the organic solvent (2) of 90:10. They were added in a rotation-revolution type mixer (product name: "Awatori Rentarou" manufactured by Thinky Corporation), followed by kneading at a rotational speed of 2000 rpm for five minutes in Example 1 and at a rotational speed of 2000 rpm for one minute in Comparative Example 1 to prepare a varnish for producing a porous film having a solid content concentration of 30% by mass, respectively. Note here that the ratio of polyamide acid to silica (polyamide acid:silica) in the obtained varnish composition was 28:72 in the volume ratio, and 20:80 in the mass ratio. Note here that a polyamide acid solution, an organic solvent, a dispersant, and fine particles mentioned below were used.

Polyamide acid solution: reaction product of pyromellitic dianhydride and 4,4'-diaminodiphenyl ether (solid content of 20% by mass (organic solvent: N,N-dimethyl acetamide))

Organic solvent (1): N,N-dimethyl acetamide (DMAc)

Organic solvent (2): gamma butyrolactone

Dispersant: polyoxyethylene secondary alkyl ether dispersant

Fine particle: silica: silica having an average particle diameter of 700 nm

The obtained varnish for producing a porous film was applied onto a polyethylene terephthalate (PET) film as a base material using an applicator to form an unburned composite film. This unburned composite film was placed in an oven, and burned at 380° C. for 15 minutes to complete imidization to obtain a resin-fine particle composite film. Thereafter, the resin-fine particle composite film was peeled off from the base material. The resin-fine particle composite film was immersed in a hydrogen fluoride solution (HF) for 10 minutes to remove silica fine particles contained in the film, followed by washing with water and drying to obtain polyimide porous films having a thickness of 40 μm of Example 1 and Comparative Example 1, respectively.

The surface roughness of the obtained polyimide porous films of Example 1 and Comparative Example 1 was measured by the following methods. Firstly, a porous film wetted with water was spread over a flat glass substrate such that a surface of the porous film at a side that is in contact with the PET film was brought into contact with a glass substrate. At that time, air between the glass substrate and the porous film was removed using the PET film to stretch out wrinkles generated on the porous film. Then, the porous film on the glass substrate was heated at 70° C. for two minutes. Thus, the surface roughness of the porous film flatly laid over the glass substrate was measured. The surface roughness was measured using the stylus type surface roughness meter Dektak150 manufactured by Ulvac Inc. according to the following conditions.

Figure 2:
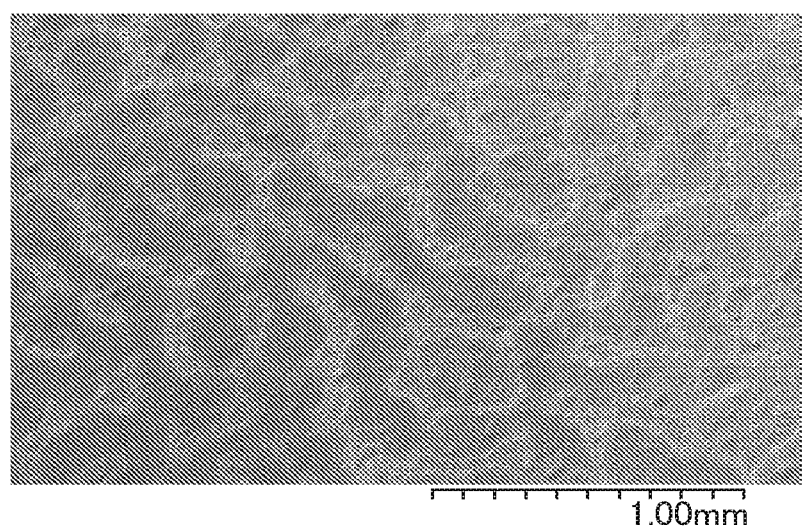
FIG. 2 shows an electron microscope image of a porous film obtained in Comparative Example 1.

Stylus radius: 12.5 μm
Measurement distance: 10000 μm
Measurement time: 120 seconds
Horizontal resolution: 0.278 μm/sample
Stylus pressure: 5.00 mg As a result of the measurement using the stylus type surface roughness meter, the surface roughness Ra of the polyimide porous film in Example 1 was 3069 Å, and the surface roughness Ra of the polyimide porous film in Comparative Example 1 was 30454 Å. Furthermore, results of observation of the surface of the porous film under a scanning electron microscope (SEM) are shown in FIG. 1 and FIG. 2. From FIG. 1 and the measurement results of the surface roughness, it is shown that no stripy waviness is observed in the surface of the polyimide porous film of Example 1, showing that the polyimide porous film of Example 1 has excellent surface smoothness. On the contrary, from FIG. 2 and the measurement results of the surface roughness, it is shown that the surface of the polyimide porous film of Comparative Example 1 had a large height difference and stripy waviness.

Examples 2 to 4

A varnish for producing a porous film was prepared in the same manner as in Example 1 except that polyamide acid was changed into polyethersulfone; the solid content concentration of a varnish was changed from 30% by mass to 42% by mass; 5% by mass of phosphoric acid dispersant with respect to silica was added into a silica dispersion liquid; only DMAc was used as an organic solvent; and the ratio of resin to silica (resin:silica) in the obtained varnish was changed from 20:80 to 30:70 in the mass ratio.

The obtained varnish for producing a porous film was applied onto a polyethylene terephthalate (PET) film as a base material using an applicator to form a coating film. This coating film was baked at 50° C. for 5 minutes to form a resin-fine particle composite film. The resin-fine particle composite film was immersed in water for three minutes. Thereafter, the resin-fine particle composite film was peeled off from the base material. The resin-fine particle composite film was immersed in hydrogen fluoride (HF) for 10 minutes to remove silica fine particles contained in the film, followed by washing with water and drying so as to obtain a polyethersulfone porous film of Example 2 having a thickness of 40 μm. Furthermore, polyethersulfone porous films in the case where the baking temperature of the coating film was changed from 50° C. to 70° C. (Example 3) and to 90° C. (Example 4), respectively, were obtained.

The surface roughness of the obtained polyethersulfone porous film in Example 2 was measured in the same manner as in Example 1. As a result of measurement using the stylus type surface roughness meter, the surface roughness Ra of the polyethersulfone porous film of Example 2 was 11000 Å. The surface roughness Ra values of the polyethersulfone porous films of Examples 3 and 4 were similar values.

Example 5

A varnish for producing a porous film was prepared in the same manner as in Example 1 except that polyamide acid was changed into polyethersulfone; the solid content concentration of the varnish was changed from 30% by mass to 35% by mass; 5% by mass of phosphoric acid dispersant with respect to silica was added into a silica dispersion liquid; only DMAc was used as an organic solvent; and the ratio of resin to silica (resin:silica) in the obtained varnish was changed from 20:80 to 30:70 in the mass ratio.

A polyethersulfone porous film of Example 5 having a thickness of 40 μm was obtained using the obtained varnish for producing a porous film in the same manner as in Example 2. The surface roughness of the obtained polyethersulfone porous film of Example 5 was measured in the same manner as in Example 1. As a result of measurement using a stylus type surface roughness meter, the surface roughness Ra of the polyethersulfone porous film of Example 5 was 8000 Å.

The invention claimed is:

1. A single layer porous film in a laminated body comprising the single layer porous film and a support or an electrode,
   wherein the single layer porous film consists of:
   a film selected from the group consisting of a polyvinylidene fluoride film, a polyethersulfone film, a polyimide film and a polyamide-imide film,
   wherein the single layer porous film has a front surface and a rear surface, wherein the front and rear surfaces communicate with each other,
   each of the front and rear surfaces has an opening portion, and the opening portions have a uniform diameter on the front and rear surfaces, and
   the single layer porous film uniformly has continuous pores in the film, the continuous pores being formed of spherical pores that communicate with each other,
   wherein the single layer porous film has a surface roughness Ra of 5000 Å or less, and
   wherein the single layer porous film is laminated on the support or the electrode such that the surface roughness Ra of 5000 Å or less adheres the single layer porous film to the support or the electrode.

2. The single layer porous film in the laminated body according to claim 1, wherein the opening portions have a diameter of 10 nm to 5000 nm.

3. The single layer porous film in the laminated body according to claim 1, wherein
   the opening portions have a diameter of 10 nm to 5000 nm, and
   the single layer porous film has no waviness, wherein the waviness is defined as a recess portion that is deeper than a recess portion formed by the opening portions.

4. The single layer porous film in the laminated body according to claim 1, wherein the surface roughness Ra is measured by spreading the single layer porous film on a substrate, heating the single layer porous film, and measuring the surface roughness of a surface of the single layer porous film opposite to a surface facing the substrate.

5. A film comprising a single layer porous film and a support,
wherein the single layer porous film consists of:
a film selected from the group consisting of a polyvinylidene fluoride film, a polyethersulfone film, a polyimide film and a polyamide-imide film,
wherein the single layer porous film has a front surface and a rear surface, wherein the front and rear surfaces communicate with each other,
each of the front and rear surfaces has an opening portion, and the opening portions have a uniform diameter on the front and rear surfaces, and
the single layer porous film uniformly has continuous pores in the film, the continuous pores being formed of spherical pores that communicate with each other,
wherein the single layer porous film has a surface roughness Ra of 5000 Å or less; and
wherein the single layer porous film is laminated on the support such that the surface roughness Ra of 5000 Å or less adheres the single layer porous film to the support.

6. The film according to claim 5, wherein the opening portions have a diameter of 10 nm to 5000 nm.

7. The film according to claim 5, wherein
the opening portions have a diameter of 10 nm to 5000 nm, and
the single layer porous film has no waviness, wherein the waviness is defined as a recess portion that is deeper than a recess portion formed by the opening portions.

8. The film according to claim 5, wherein the surface roughness Ra is measured by spreading the single layer porous film on a substrate, heating the single layer porous film, and measuring the surface roughness of a surface of the single layer porous film opposite to a surface facing the substrate.

9. A battery comprising a separator,
wherein the separator comprises a single layer porous film and an electrode,
wherein the single layer porous film consists of:
a film selected from the group consisting of a polyvinylidene fluoride film, a polyethersulfone film, a polyimide film and a polyamide-imide film,
wherein the single layer porous film has a front surface and a rear surface, wherein the front and rear surfaces communicate with each other,
each of the front and rear surfaces has an opening portion, and the opening portions have a uniform diameter on the front and rear surfaces, and
the single layer porous film uniformly has continuous pores in the film, the continuous pores being formed of spherical pores that communicate with each other,
wherein the single layer porous film has a surface roughness Ra of 5000 Å or less; and
wherein the single layer porous film is laminated on the electrode such that the surface roughness Ra of 5000 Å or less adheres the single layer porous film to the electrode.

10. The battery according to claim 9, wherein the opening portions have a diameter of 10 nm to 5000 nm.

11. The battery according to claim 9, wherein
the opening portions have a diameter of 10 nm to 5000 nm, and
the single layer porous film has no waviness, wherein the waviness is defined as a recess portion that is deeper than a recess portion formed by the opening portions.

12. The battery according to claim 9, wherein the surface roughness Ra is measured by spreading the single layer porous film on a substrate, heating the single layer porous film, and measuring the surface roughness of a surface of the single layer porous film opposite to a surface facing the substrate.

13. The single layer porous film in the laminated body according to claim 1, wherein the opening portions have a diameter of 2000 nm to 5000 nm.

14. The film according to claim 5, wherein the opening portions have a diameter of 2000 nm to 5000 nm.

15. The single layer porous film in the laminated body according to claim 1, wherein the surface roughness Ra is 3069 Å to 5000 Å.

16. The film according to claim 5, wherein the surface roughness Ra is 3069 Å to 5000 Å.

* * * * *